United States Patent
Hemminger et al.

(10) Patent No.: US 11,492,944 B2
(45) Date of Patent: Nov. 8, 2022

(54) EXHAUST GAS SYSTEM FOR A MOTOR VEHICLE, METHOD FOR OPERATING AN EXHAUST GAS SYSTEM, AND MOTOR VEHICLE

(71) Applicants: Dr. Ing. h.c. F. Porsche Aktiengesellschaft, Stuttgart (DE); Volkswagen AG, Wolfsburg (DE)

(72) Inventors: Sebastian Hemminger, Oberriexingen (DE); Rico Fischer, Mühlacker (DE); Steffen Leicht, Wirnsheim (DE); Lukas Engin, Ingersheim (DE); Markus Timmer, Leonberg (DE); Jens Gockel, Bestwig (DE)

(73) Assignees: Dr. Ing. h.c. F. Porsche Aktiengesellschaft; Volkswagen AG

( * ) Notice: Subject to any disclaimer, the term of this patent is extended or adjusted under 35 U.S.C. 154(b) by 0 days.

(21) Appl. No.: 17/476,686

(22) Filed: Sep. 16, 2021

(65) Prior Publication Data
US 2022/0136423 A1 May 5, 2022

(30) Foreign Application Priority Data
Oct. 29, 2020 (DE) ............ 10 2020 128 503.5

(51) Int. Cl.
*F01N 3/00* (2006.01)
*F01N 3/20* (2006.01)

(52) U.S. Cl.
CPC ........ *F01N 3/2033* (2013.01); *F01N 2240/14* (2013.01); *F01N 2560/06* (2013.01)

(58) Field of Classification Search
CPC . F01N 3/2033; F01N 2240/14; F01N 2560/06
See application file for complete search history.

(56) References Cited

U.S. PATENT DOCUMENTS

| | | | |
|---|---|---|---|
| 11,256,242 B2* | 2/2022 | Celia | H04B 17/23 |
| 11,256,243 B2* | 2/2022 | Celia | H04L 1/0002 |
| 2006/0046218 A1* | 3/2006 | Joklik | F02D 19/029 431/75 |
| 2007/0119147 A1* | 5/2007 | Cornwell | F01D 21/003 60/39.281 |
| 2010/0151397 A1* | 6/2010 | Farrell | F23N 5/18 431/75 |
| 2014/0080075 A1* | 3/2014 | Young | F23N 1/022 431/18 |

FOREIGN PATENT DOCUMENTS

| | | | |
|---|---|---|---|
| CN | 201206487 Y | * | 3/2009 |
| CN | 205605271 U | | 9/2016 |
| DE | 19945562 A1 | | 4/2001 |
| DE | 10125588 C1 | | 6/2002 |
| DE | 102004038738 A1 | | 2/2006 |
| DE | 102012215414 A1 | | 1/2014 |
| DE | 102019114788 A1 | | 12/2020 |
| JP | 59136511 A | | 8/1984 |
| JP | 59221415 A | | 12/1984 |

OTHER PUBLICATIONS

Great Britain Combined Search and Examination Report for Application No. GB2115583.3, dated Apr. 1, 2022, 3 pages.

* cited by examiner

*Primary Examiner* — Matthew T Largi
(74) *Attorney, Agent, or Firm* — RatnerPrestia

(57) ABSTRACT

An exhaust gas system for a motor vehicle includes an exhaust gas burner and a pressure sensor for sensing flame formation in the exhaust gas burner.

18 Claims, 1 Drawing Sheet

EXHAUST GAS SYSTEM FOR A MOTOR VEHICLE, METHOD FOR OPERATING AN EXHAUST GAS SYSTEM, AND MOTOR VEHICLE

CROSS-REFERENCE TO RELATED APPLICATION

This application claims priority to German Patent Application No. 10 2020 128 503.5, filed Oct. 29, 2020, the content of such application being incorporated by reference herein in its entirety.

FIELD OF THE INVENTION

The present invention relates to an exhaust gas system for a motor vehicle, a method for operating an exhaust gas system, and a motor vehicle incorporating the exhaust gas system.

BACKGROUND OF THE INVENTION

In order to meet the ever-increasing requirements placed on the environmental friendliness zo of motor vehicles comprising internal combustion engines, the treatment of the exhaust gases from the internal combustion engine in the exhaust gas system is becoming more and more complicated. Modern motor vehicles have complex exhaust gas systems, the individual components of which make highly efficient contributions to optimizing the performance of the motor vehicle and purifying the exhaust gases.

In particular, high demands are placed on the exhaust gas purification components such as catalytic converters or particulate filters. In order to meet these demands, the boundary conditions for operating the exhaust gas purification components must be right. For example, the efficiency of catalytic converters depends on the temperature thereof. In particular when the motor vehicle is started from cold, the temperature of the catalytic converters is usually below the so-called light-off temperature, from which the catalytic converters operate with a high degree of efficiency. Other exhaust gas purification components, in particular particulate filters, occasionally have to be brought to a regeneration temperature in order to be rid of soot particles deposited therein.

In order to reach these high temperatures quickly and in a targeted manner, exhaust gas systems usually comprise exhaust gas burners. A fuel-air mixture is ignited in the exhaust gas burners and the hot exhaust gas from the combustion of the fuel-air mixture is conveyed to the points to be heated, for example to a catalytic converter or a particulate filter.

For this purpose, combustion air is typically supplied to the exhaust gas burner via a supply air path and fuel is supplied to the exhaust gas burner via a fuel line. In a combustion chamber, combustion air and fuel mix together and are ignited by an ignition means. In order to ensure that the exhaust gas system operates without errors, it is important that the ignition, i.e. the flame formation, in the exhaust gas burner is monitored. Temperature sensors often react slowly. Moreover, the location of temperature sensors arranged on the exhaust gas burner is extremely critical for obtaining accurate information about flame formation.

The problem addressed by the present invention is that of providing an exhaust gas system which does not have the aforementioned disadvantages of the prior art but which makes it possible to robustly and accurately sense the flame formation in the exhaust gas burner.

This problem is solved by an exhaust gas system for a motor vehicle, the exhaust gas system comprising an exhaust gas burner, wherein the exhaust gas system comprises a pressure sensor for sensing flame formation in the exhaust gas burner.

SUMMARY OF THE INVENTION

The exhaust gas system according to aspects of the invention allows the flame formation to be sensed accurately and unequivocally via a pressure change at the moment the flame forms in the exhaust gas burner. In contrast to a temperature sensor, the flame formation is detected by the pressure sensor without a latency caused by the delayed heating of the temperature sensor. In addition, the arrangement of the pressure sensor is significantly less critical, and therefore the pressure sensor can also be arranged further away from the combustion chamber of the exhaust gas burner and is thus well protected from the heat generated by the combustion.

Advantageous embodiments and developments of the invention can be found in the dependent claims and in the description with reference to the drawings.

According to a preferred embodiment of the invention, the exhaust gas system comprises a supply air path for introducing combustion air into the exhaust gas burner, the pressure sensor being arranged in the supply air path and in particular outside a combustion chamber of the exhaust gas burner. This allows optimal use of the available installation space and allows the pressure sensor to be protected from excessive heat.

According to a further preferred embodiment of the invention, the exhaust gas system comprises a further pressure sensor, the further pressure sensor being arranged in an exhaust gas path of the exhaust gas burner, the pressure sensor and the further pressure sensor being configured to determine a differential pressure between the supply air path and the exhaust gas path. By determining the pressure upstream of the exhaust gas burner and determining the pressure downstream of the exhaust gas burner, the formation of flames can be inferred highly accurately from the pressure difference.

According to a further preferred embodiment of the invention, the exhaust gas system comprises an optical sensor arranged in the exhaust gas burner, preferably in the combustion chamber. This advantageously allows the sensing of the flame formation to be checked optically.

According to a further preferred embodiment of the invention, the supply air path comprises an air pump for conveying air into the exhaust gas burner, the pressure sensor being arranged between the air pump and the exhaust gas burner, the pressure sensor preferably being arranged between the air pump and a valve of the supply air path. This advantageously ensures that the pressure sensor is able to detect the change in pressure generated by the flame formation. The air pump is preferably adjustable so that more or less air can be conveyed into the exhaust gas burner. The valve is preferably a non-return valve which prevents the fuel-air mixture from the exhaust gas burner from reaching the supply air path. The supply air path preferably comprises an air filter.

According to a further preferred embodiment of the invention, the pressure sensor is designed as a dual sensor for sensing pressure and temperature. This advantageously allows the temperature of the air introduced into the exhaust gas burner to be measured.

For this purpose, the exhaust gas system preferably comprises a temperature sensor for sensing an exhaust gas temperature of the exhaust gas burner. This advantageously allows a differential temperature between air flowing into the exhaust gas burner and exhaust gas flowing out of the exhaust gas burner to be measured and thus allows the pressure sensor to check the sensing of the flame formation.

In order to solve the problem mentioned at the outset, the invention also relates to a method for operating an exhaust gas system of a motor vehicle, wherein flame formation in an exhaust gas burner of the exhaust gas system is sensed by means of a pressure sensor.

The method according to aspects of the invention allows the flame formation in the exhaust gas burner to be precisely sensed. In contrast to sensing via a change in temperature, in the method according to aspects of the invention the flame formation is detected without a latency caused by the delayed heating of a temperature sensor. In addition, the location at which the pressure is sensed is significantly less critical than in the case of temperature-based sensing using temperature sensors known from the prior art.

According to a further preferred embodiment of the invention, the air pressure within a supply air path for introducing combustion air into the exhaust gas burner is sensed by the pressure sensor. This ensures that the pressure sensor is well protected from excessive heat in the exhaust gas burner.

According to a further preferred embodiment of the invention, the flame formation is sensed on the basis of a differential pressure between the supply air path and an exhaust gas path of the exhaust gas burner. This provides another very accurate way of determining flame formation.

According to a further preferred embodiment of the invention, the flame formation is also sensed:
- optically inside a combustion chamber of the exhaust gas burner and/or
- via a temperature difference between air flowing into the exhaust gas burner and exhaust gas flowing out of the exhaust gas burner and/or
- acoustically by means of a knock sensor of the motor vehicle.

This advantageously allows the pressure-assisted sensing of the flame formation to be checked effectively. In particular, the use of the knock sensor is advantageous because it is usually present in a motor vehicle and therefore no further components have to be used.

According to a further preferred embodiment of the invention, an exhaust gas system according to aspects of the invention is used.

In order to solve the problem mentioned at the outset, the invention also relates to a motor vehicle comprising an exhaust gas system according to aspects of the invention.

All of the details, features and advantages disclosed above in connection with the exhaust gas system according to aspects of the invention also apply to the motor vehicle according to aspects of the invention and to the method according to aspects of the invention.

BRIEF DESCRIPTION OF THE DRAWINGS

Further details, features and advantages of the invention can be found in the drawings and in the following description of preferred embodiments with reference to the drawings. The drawings merely illustrate exemplary embodiments of the invention which do not restrict the concept of the invention.

DETAILED DESCRIPTION OF THE INVENTION

Figure 1:
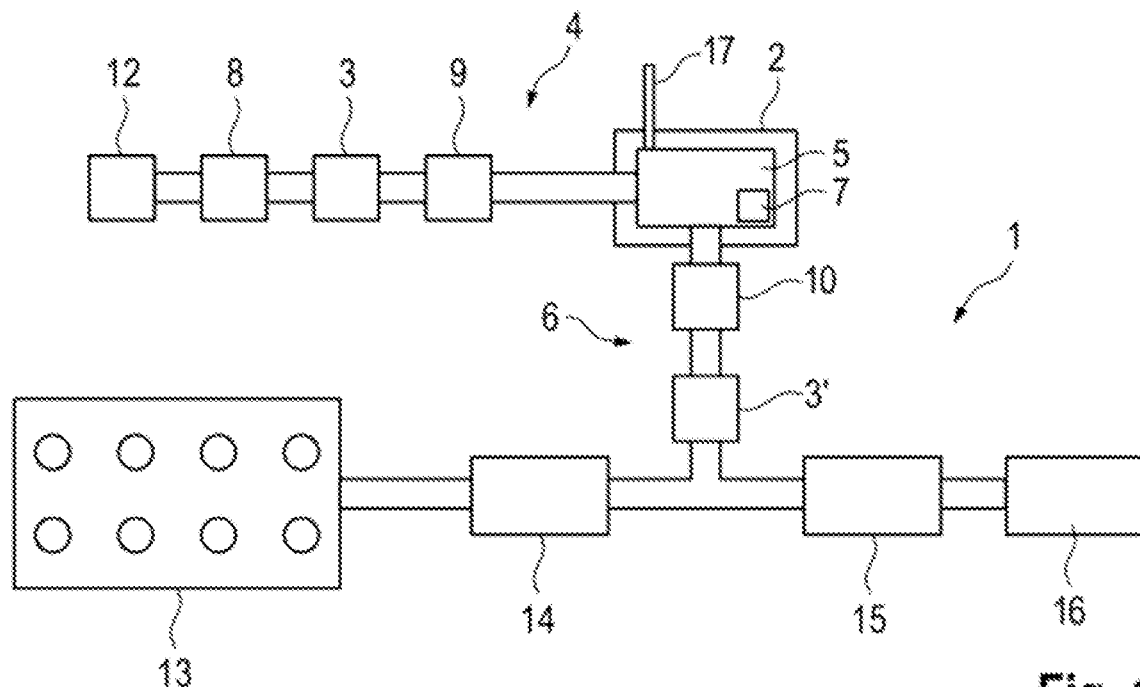
FIG. 1 is a schematic view of an exhaust gas system according to an exemplary embodiment of the present invention.

FIG. 1 is a schematic view of an exhaust gas system 1 according to an exemplary embodiment of the present invention. The exhaust gas system 1 discharges exhaust gases from an internal combustion engine 13 of a motor vehicle and purifies these gases in a first catalytic converter 14, a second catalytic converter 15 and a particulate filter 16.

In order to bring the second catalytic converter 15 and the particulate filter 16 to a specific temperature quickly and precisely, for example after a cold start, the exhaust gas system 1 comprises an exhaust gas burner 2. Fuel and combustion air are fed into a combustion chamber 5 of the exhaust gas burner 2 via a fuel line 17 and a supply air path 4, respectively. The mixture of combustion air and fuel is then ignited and combusted in the combustion chamber 5. The resulting hot exhaust gases are conducted via an exhaust gas path 6 to the second catalytic converter 15 and to the particulate filter 16 and heat them.

In order to precisely control the exhaust gas system 1, it is essential that the combustion, in particular the flame formation, in the exhaust gas burner 2 is monitored. For this purpose, the exhaust gas system 1 comprises a pressure sensor 3. The pressure sensor 3 is arranged in the supply air path 4 and is spaced so far apart from the exhaust gas burner 2 that the pressure sensor 3 is protected from heat generated in the combustion chamber 5. If the mixture of combustion air and fuel ignites in the combustion chamber 5 and a flame is formed in the process, this can be recorded by the pressure sensor 3 as a result of the change in pressure.

In addition to the pressure sensor 3, the supply air path 4 comprises an air filter 12 for purifying the combustion air, an air pump 8 for generating an air flow toward the exhaust gas burner 2, and a valve 9. The pressure sensor 3 is arranged between the air pump 8 and the valve 9, which is designed as a non-return valve. As a result, the pressure sensor 3 is able to record the pressure change caused by the flame formation.

A further pressure sensor 3' is arranged in the exhaust gas path 6 of the exhaust gas burner 2. Together with the pressure sensor 3, a differential pressure across the exhaust gas burner 2 can therefore be determined. This also allows the flame formation in the combustion chamber 5 to be sensed in a highly accurate manner.

Furthermore, the exhaust gas path 6 comprises a temperature sensor 10 for measuring the temperature of the exhaust gas from the exhaust gas burner 2. The pressure sensor 3 is preferably designed as a dual sensor for determining pressure and temperature. By determining the temperature in the supply air path 4 and the temperature of the exhaust gas of the exhaust gas burner 2, the formation of flames can also be inferred using the pressure sensor 3 and the temperature sensor 10, and the pressure-based sensing of the flame formation can thus be checked. The exhaust gas burner 2 in the combustion chamber 5 also comprises an optical sensor 7 to check the pressure-assisted sensing of the flame formation. The formation of flames can also be inferred acoustically using a knock sensor (see FIG. 2) of the motor vehicle.

Figure 2:
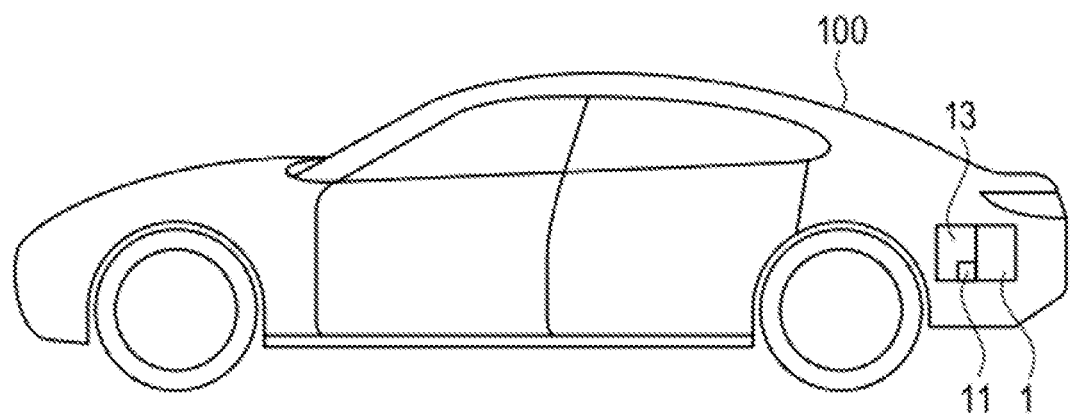
FIG. 2 is a schematic view of a motor vehicle according to an exemplary embodiment of the present invention.

FIG. 2 is a schematic view of a motor vehicle 100 according to an exemplary embodiment of the present invention. The motor vehicle 100 comprises an internal combustion engine 13 and an exhaust gas system 1 according to an exemplary embodiment of the present invention. The sensing of the flame formation in the exhaust gas burner of the exhaust gas system 1 is checked acoustically by means of a knock sensor 11.

LIST OF REFERENCE SIGNS 1 exhaust gas system
2 exhaust gas burner
3 pressure sensor
3' further pressure sensor
4 supply air path
5 combustion chamber
6 exhaust gas path
7 optical sensor
8 air pump
9 valve
10 temperature sensor
11 knock sensor
12 air filter
13 internal combustion engine
14 first catalytic converter
15 second catalytic converter
16 particulate filter
17 fuel line
100 motor vehicle

What is claimed is:

1. An exhaust gas system for a motor vehicle, said exhaust gas system comprising:
    an engine exhaust gas path through which combustion products are delivered from an engine of the motor vehicle;
    an exhaust gas burner and a pressure sensor for sensing flame formation in the exhaust gas burner;
    a burner exhaust gas path connecting the exhaust gas burner with the engine exhaust gas path, the burner exhaust gas path intersecting the engine exhaust gas path at an intersection point;
    a supply air path for introducing combustion air into the exhaust gas burner, the pressure sensor being arranged in the supply air path and outside of a combustion chamber of the exhaust gas burner;
    a further pressure sensor being arranged in the burner exhaust gas path, the pressure sensor and the further pressure sensor being configured to determine a differential pressure between the supply air path and the burner exhaust gas path, wherein the pressure sensor and the further pressure sensor are both arranged upstream of the intersection point.

2. The exhaust gas system according to claim 1, wherein the exhaust gas system comprises an optical sensor arranged in the combustion chamber.

3. The exhaust gas system according to claim 1, wherein the supply air path comprises an air pump for conveying air into the exhaust gas burner, the pressure sensor being arranged between the air pump and the exhaust gas burner, the pressure sensor being arranged between the air pump and a valve of the supply air path.

4. The exhaust gas system according to claim 1, wherein the pressure sensor is a dual sensor for sensing pressure and temperature.

5. The exhaust gas system according claim 1 further comprising a temperature sensor for sensing an exhaust gas temperature of the exhaust gas burner.

6. The exhaust gas system according to claim 5, wherein the temperature sensor is arranged in the burner exhaust gas path at a location between the further pressure sensor and the exhaust gas burner.

7. A motor vehicle comprising the exhaust gas system according to claim 1.

8. The exhaust gas system according to claim 1, further comprising a first catalytic converter positioned upstream of the intersection point.

9. The exhaust gas system according to claim 8, further comprising a second catalytic converter positioned downstream of the intersection point.

10. The exhaust gas system according to claim 9, further comprising a filter positioned downstream of the second catalytic converter.

11. The exhaust gas system according to claim 1, wherein the further pressure sensor is exposed to pressures within the burner exhaust gas path and the engine exhaust gas path.

12. The exhaust gas system according to claim 1, further comprising a non-return valve arranged in the supply air path at a location between the pressure sensor and the exhaust gas burner.

13. A method for operating an exhaust gas system of a motor vehicle, said method comprising:
    delivering engine combustion products produced by an engine of the motor vehicle through an engine exhaust gas path;
    delivering combustion air through a supply air path and to an exhaust gas burner of the exhaust gas system,
    delivering burner combustion products produced by the exhaust gas burner through a burner exhaust gas path that connects the exhaust gas burner with the engine exhaust gas path, wherein the burner exhaust gas path intersects the engine exhaust gas path at an intersection point; and
    determining a differential pressure between the supply air path and the burner exhaust gas path using both a pressure sensor positioned within the air supply path and a further pressure sensor positioned within the burner exhaust gas path to sense flame formation in the exhaust gas burner, wherein the pressure sensor and the further pressure sensor are both arranged upstream of the intersection point.

14. The method according to claim 13, further comprising sensing flame formation:
    (i) optically inside of a combustion chamber of the exhaust gas burner, and/or
    (ii) via a temperature difference between air flowing into the exhaust gas burner and exhaust gas flowing out of the exhaust gas burner, and/or
    (iii) acoustically using a knock sensor of the motor vehicle.

15. The method according to claim 13, further comprising sensing flame formation optically inside of a combustion chamber of the exhaust gas burner.

16. The method according to claim 13, further comprising sensing flame formation via a temperature difference between air flowing into the exhaust gas burner and exhaust gas flowing out of the exhaust gas burner.

17. The method according to claim 13, further comprising sensing flame formation acoustically using a knock sensor of the motor vehicle.

18. The method according to claim 13, further comprising sensing flame formation:

(i) optically inside of a combustion chamber of the exhaust gas burner,
(ii) via a temperature difference between air flowing into the exhaust gas burner and exhaust gas flowing out of the exhaust gas burner, and
(iii) acoustically using a knock sensor of the motor vehicle.

\* \* \* \* \*